United States Patent
Götz et al.

[11] Patent Number: 6,007,089
[45] Date of Patent: Dec. 28, 1999

[54] PASSENGER RESTRAINT SYSTEM FOR THE BACKSEAT OF A VEHICLE

[75] Inventors: Herwig Götz, Lenting; Folkert Ostermann, Erkrath, both of Germany

[73] Assignee: Audi AG, Ingolstadt, Germany

[21] Appl. No.: 09/015,477

[22] Filed: Jan. 29, 1998

Related U.S. Application Data

[63] Continuation-in-part of application No. PCT/EP96/02494, Jun. 8, 1996.

[30] Foreign Application Priority Data

Aug. 4, 1995 [DE] Germany ............ 195 28 627

[51] Int. Cl.⁶ ............................................. B60R 21/16
[52] U.S. Cl. ......................... 280/728.3; 297/216.13
[58] Field of Search ............... 280/728.1, 728.3, 280/728.2; 297/216.1, 216.13, 378.1, DIG. 3, 216.14; 296/37.1, 63

[56] References Cited

U.S. PATENT DOCUMENTS

| | | |
|---|---|---|
| 4,097,064 | 6/1978 | Ikawa et al. . |
| 4,327,937 | 5/1982 | Scholz et al. . |
| 5,082,310 | 1/1992 | Bauer . |
| 5,112,079 | 5/1992 | Haland et al. . |
| 5,222,761 | 6/1993 | Kaji et al. . |
| 5,251,931 | 10/1993 | Semchena et al. . |
| 5,273,336 | 12/1993 | Schubring et al. . |
| 5,348,342 | 9/1994 | Haland et al. . |
| 5,449,196 | 9/1995 | Ohno et al. . |
| 5,601,332 | 2/1997 | Schultz et al. . |
| 5,813,693 | 9/1998 | Gordon et al. . |
| 5,826,938 | 10/1998 | Yanase et al. . |
| 5,845,930 | 12/1998 | Maly et al. . |

FOREIGN PATENT DOCUMENTS

| | | |
|---|---|---|
| 4018 470 | 12/1990 | Germany . |
| 43 29275 | 3/1995 | Germany . |
| 195 15851 | 11/1995 | Germany . |
| 4-166451 | 9/1992 | Japan . |
| 2 261 636 | 5/1993 | United Kingdom . |
| 2 293 355 | 3/1996 | United Kingdom . |

Primary Examiner—Milton Nelson, Jr.
Attorney, Agent, or Firm—Feix & Feix

[57] ABSTRACT

An air bag module (1) including an air bag (9) and a gas generator (7) disposed in the region of the outside seat back edge of the back seat of a vehicle. The air bag module (1) is covered by a flap (11) having a section (15) oriented in the direction of travel. The section (15) has a free end (13) disposed adjacent to a side part of the vehicle body or trim (17) thereby forming a gap (19) through which the air bag (9) emerges unhindered during deployment.

20 Claims, 1 Drawing Sheet

PASSENGER RESTRAINT SYSTEM FOR THE BACKSEAT OF A VEHICLE

This application is a continuation-in-part of PCT/EP96/02494, filed Jun. 8, 1996.

TECHNICAL FIELD

The present invention relates to a passenger restraint system for the rear seat of a vehicle and more particularly to such a passenger restraint system which incorporate an inflatable bag, commonly termed an "air bag", and a gas generator.

BACKGROUND OF THE INVENTION

Passenger restraint systems for the rear seat of a vehicle which incorporate an air bag and gas generator have been proposed previously in the prior art. The known passenger restraint systems equipped with an air bag and a gas generator are generally installed in the region of the outer edge of the seat back. The air bag module, consisting of the air bag and gas generator, is covered on the outside with upholstery material for the seat back. The upholstery material covering is provided with a tear-seam that forms a weak spot at the point where the air bag is intended to emerge during deployment. In practice, it has been shown that the deployment force required for the air bag to penetrate the upholstery covering at the tear-seam varies greatly. The effects of this variation can include a negative effect on the desired deployment speed with which the air bag emerges.

Published Japanese Patent Abstract JP 4-166451 discloses another air bag equipped passenger restraint system in which the air bag module is installed in the rear side door as protection for the rear seated passengers in the event of a lateral impact. The air bag module is disposed within the rear side door and is covered by a padded flap. The padded flap includes a weakened point designed as a breaking point for the emergence of the air bag upon deployment. Here again, the breaking point of the padded flap covering cannot be easily controlled. In addition, the violent tearing of the padded flap covering caused by the strong inflation force of the air bag may form undesirable sharp-edged burrs along the breaking point which could puncture the air bag.

SUMMARY OF THE INVENTION

It is an object of the invention to create, with simple means, an air bag restraint system for protection of rear seated passengers in the event of a side impact, wherein the air bag restraint system uses a padded flap for covering the air bag, and wherein the padded flap can be installed in a favorable location and has no breaking points that hinder the rapidly controlled deployment (emergence) of the air bag.

The proposed solution replaces the breaking points in the air bag coverings used heretofore with an opening resulting from the design of the flap and the way it is mounted in the vehicle.

In accordance with the present invention, an air bag module comprising an air bag and gas generator is positioned in the area of the outer, upper edge of a seat back for a rear seated passenger. This results in a favorable relationship between the position of the air bag with respect to the rear seated passenger's head. Especially advantageous is the manner of installation and the design of the flap covering for the air bag module on the side facing the passenger space. The section of the flap pointing forward in the direction of the vehicle's movement has a free end portion that abuts against a lateral part of the interior vehicle body or of the interior panelling. This region of abutment defines a crack-like opening for the emergence of the air bag. In the space enclosed by the flap, the air bag and the gas generator are mounted in such a way that the air bag, upon inflation, deploys or emerges through this crack-like opening. When the air bag emerges, the flap is forced aside thereby creating a larger opening. This can happen through bending of the flap, or by its swinging aside, or by means of a combination of both possibilities.

The lateral interior portion of the vehicle body or of the panelling against which the free end of the flap abuts (and with which the flap forms the crack-like opening) may include, for example, the rear roof support (rear pillar) or the interior panelling that covers this roof support. Such pieces of interior panelling are typically made of plastic and are frequently used in this location to bridge the area between the back of the rear seat and the door sealing. The details of the design of this piece of panelling can be taken into consideration in determining the direction and the contact surface for the air bag.

In accordance with one especially advantageous embodiment of the invention, the flap and the air bag module are designed as an integral part of a forwardly foldable rear seat back. The flap is preferably formed as part of the seat back with the surface finish and contour of the flap fashioned accordingly. Since the flap forms a part of the seat back upholstery, it is scarcely visually distinguishable from seat backs of the usual construction. The technical function of the crack-like opening, defined by the abutment of the flap against the adjacent lateral interior structural portions of the vehicle, is not readily apparent to the occupants of the vehicle.

In order to achieve a rapid and control deployment of the air bag, it is important to ensure that the flap opens widely enough when necessary. This is easily accomplished by constructing the flap of a material or materials having sufficient elasticity. However, it is also conceivable that the portion of the seat back's upholstery connecting to the flap does not do so directly, but instead connects with the flap in such a way that a small pocket is formed.

In the case of the embodiment where the air bag module is integrated into the seat back, it is advantageous that the seat back and the air bag module be assembled in advance. In this way the entire subassembly can then be installed in the vehicle on the final assembly line, thus saving time.

In the case of motor vehicles having rigid seat backs, it is preferred to install the flap covering and air bag module adjacent the outer edge of the rear seat back. In this way, no modifications of the seat back are necessary. Furthermore, the air bag module can be attached directly to the adjacent lateral interior portion of the vehicle body or interior panelling.

If the invention is given a suitable design, the flap can form a continuation of the contour and the surface of the seat back when the air bag module is attached next to the seat back. This to produces a broader seating for the air bag module. When the air bag module is installed in this way, the flap should be given the appropriate shape. In particular, the flap should be covered with the same upholstery material as the seat back.

It is especially advantageous to provide a certain amount of pre-tension to the flap so that it is biased to abut under tension against the lateral interior vehicle body or panelling part. A zero-breadth joint is thereby achieved, which is visually very attractive. Furthermore, the pre-tension counteracts the occurrence of noises. In a preferred embodiment, the pre-tension is provided by a spring saddle which is incorporated inside the flap and is surrounded by foam padding.

For the flap, a u-shaped design is suggested as preferable. One of the two legs of the u-shaped flap serves for the fixed attachment of the flap to the vehicle body or seat back, while the other free end of the u-shaped flap abuts against the lateral part of the vehicle body or the interior panelling. The u-shape configuration makes it possible to easily adapt the flap to local conditions and also enables the flap to swing aside easily.

Finally, the flap can have a friction-reducing surface on its inner side, at least in the area near the opening. With such a surface, the air bag slides along the inner side of the flap without much resistance when it unfolds, which results in quick and unhindered deployment of the air bag.

Methods and apparatus which incorporate the features described above and which are effective to function as described above constitute specific objects of this invention.

Other and further objects of the present invention will be apparent from the following description and claims and are illustrated in the accompanying drawings, which by way of illustration, show preferred embodiments of the present invention and the principles thereof and what are now considered to be the best modes contemplated for applying these principles. Other embodiments of the invention embodying the same or equivalent principles may be used and structural changes may be made as desired by those skilled in the art without departing from the present invention and the purview of the appended claims.

BRIEF DESCRIPTION OF THE DRAWINGS

An example of an embodiment of the invention is described as follows with reference to the drawings, in which.

DESCRIPTION OF THE PREFERRED EMBODIMENTS

Figure 1:
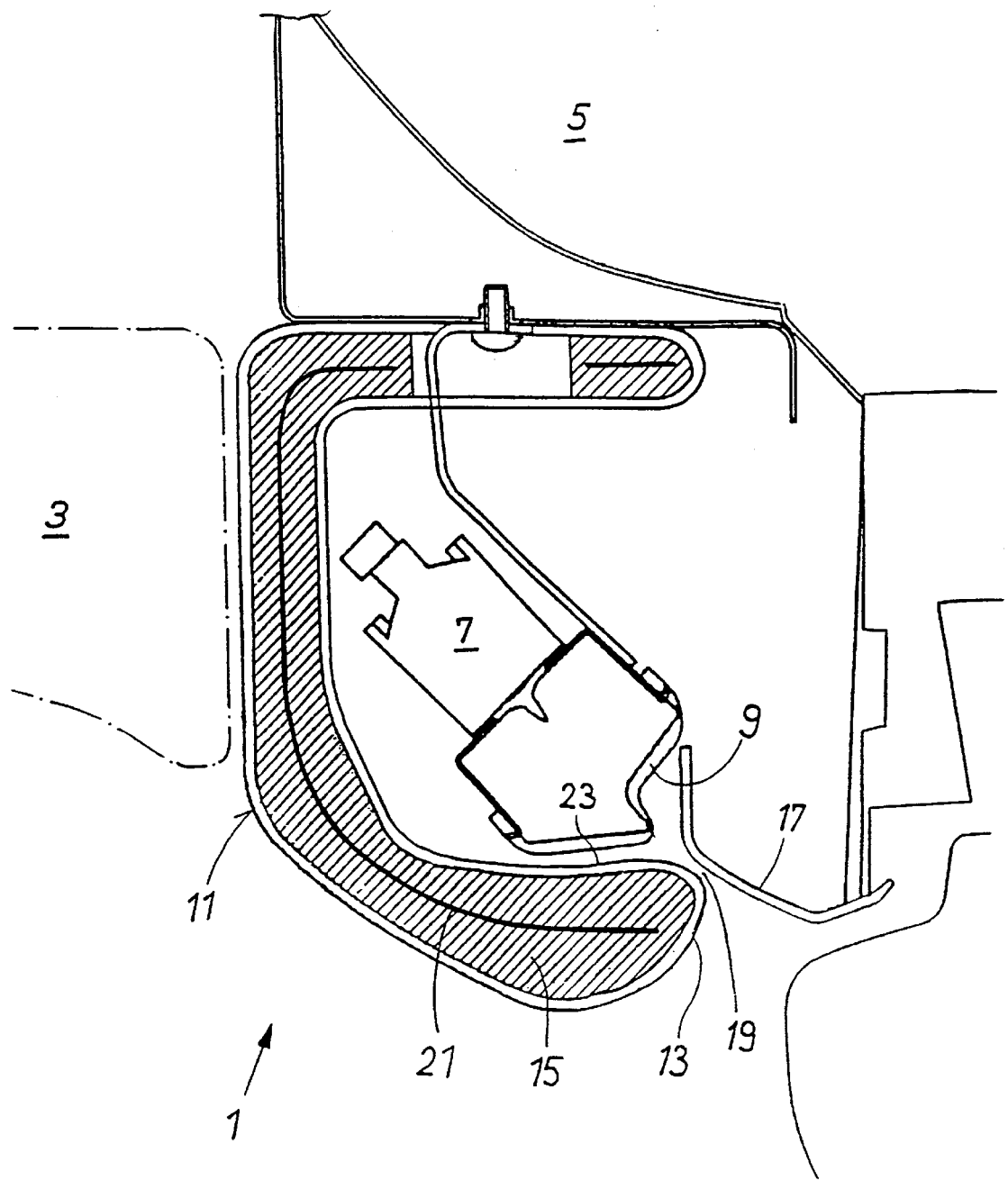
FIG. 1 shows, in a horizontal section, a passenger restraint system with an air bag module 1, mounted the area of line 3 of a rear seat where the rear seat is adjacent to a rear pillar 5 of a vehicle's body.

With reference to FIG. 1, the air bag module 1 includes a gas generator 7 with a folded-up air bag 9. The air bag module 1 attaches to a interior portion of the vehicle body, in this case interior column (pillar) 5. On the side facing the interior of the vehicle, the air bag module I is covered by a flap member 11. In the preferred embodiment shown, the flap 11 has a u-shaped cross section. The free end 13 of the section 15 of the flap 11 (i.e., the end which faces toward the vehicle's interior, abuts, under tension, against a lateral interior portion of the vehicle body. In the embodiment shown, the free end 13 abuts against the interior panelling 17 of the column 5. In another embodiment (not shown), the lateral interior portion against which the free end 13 abuts may be the vehicle body framework. The abutment described above defines an opening 19 which serves for the emergence of the air bag 9.

The preferred means for providing pre-tension to the flap to hold it in abutment with the to interior panelling 17 comprises a spring saddle 21. In the transverse section, it can be seen that the spring saddle 21 is mounted inside of the flap 11, which is filled with foam rubber. The side of the flap 11 facing toward the passenger space is covered with an upholstering material that corresponds to that used for the seat back 3. Lastly, the inner surface 23 of the flap 11 has a layer of a friction-reducing substance in the area near the opening 19 and the air bag 9. The friction-reducing substance increases the speed of emergence of the air bag 9. The sensor-controlled triggering of the gas generator 7 and the inflating of the air bag 9 thereby produced have the effect of bending the flap 11 outwardly thereby overcoming its own elasticity and the force of the saddle spring 21. Simultaneously, the padded seat back 3 is compressed in the area where it is adjacent to the flap 11.

While we have illustrated and described the preferred embodiments of our invention, it is to be understood that these are capable of variation and modification, and we therefore do not wish to be limited to the precise details set forth, but desire to avail ourselves of such changes and alterations as fall within the purview of the following claims.

We claim:

1. In combination with a rear seat region of a motor vehicle having a seat back for a rear seated passenger, the seat back disposed adjacent a lateral interior body portion of the vehicle, an air bag restraint system comprising:
   a) an air bag module disposed at an upper outer edge region of said seat back, said air bag module including an inflatable air bag and gas generator;
   b) a flap member covering said air bag module, said flap member including:
      i) a first fixed end connected to an interior body portion of the vehicle body;
      ii) a second free end abutting under tension against the lateral interior body portion of the vehicle; and
      iii) whereby inflation of said air bag forces said second free end away from abutment with the lateral interior body portion of the vehicle creating an opening through which said air bag emerges.

2. A combination according to claim 1, wherein:
   a) said air bag module and flap member are formed integral with said rear seat back; and
   b) said rear seat back includes means which permit said seat back to be folded forward.

3. A combination according to claim 1, wherein said flap member is U-shaped in horizontal section.

4. A combination according to claim 1, wherein said free end of said flap member is provided with a friction reducing surface at least in an region adjacent the abutment with the lateral interior vehicle body portion.

5. A combination according to claim 1, wherein said flap member is formed of a material of sufficient elasticity which permits said free end to bend outwardly and away from abutment with said lateral interior vehicle body portion of said vehicle upon inflation of said air bag.

6. A combination according to claim 5, wherein said flap member includes pre-tension means for holding said flap member in abutment with the lateral interior vehicle body portion.

7. A combination according to claim 1, wherein said flap member includes pre-tension means for holding said flap member in abutment with the lateral interior vehicle body portion.

8. A combination according to claim 7, wherein said pre-tension means comprises a spring saddle disposed internally of said flap member.

9. A combination according to claim 7, wherein said flap member is U-shaped in horizontal section.

10. A combination according to claim 7, wherein said free end of said flap member is provided with a friction reducing surface at least in an region adjacent the abutment with the lateral interior vehicle body portion.

11. In combination with a rear seat region of a motor vehicle having a seat back for a rear seated passenger, the seat back disposed adjacent a lateral interior body portion of the vehicle, an air bag restraint system comprising:
   a) an air bag module disposed at a position between an upper outer edge region of the seat back and the lateral interior body portion of the vehicle, said air bag module including an inflatable air bag and gas generator;
   b) a flap member disposed covering said air bag module and including:
      i) a first fixed end connected to an interior body portion of the vehicle body;
      ii) a second free end abutting under tension against the lateral interior body portion of the vehicle; and
      iii) whereby inflation of said air bag forces said second free end away from abutment with the lateral interior body portion of the vehicle creating an opening through which said air bag emerges.

12. A combination according to claim 11, wherein said flap member is configured to form a continuation of the seat back in contour and surface texture.

13. A combination according to claim 11, wherein said flap member is U-shaped in horizontal section.

14. A combination according to claim 11, wherein said free end of said flap member is provided with a friction reducing surface at least in an region adjacent the abutment with the lateral interior vehicle body portion.

15. A combination according to claim 11, wherein said flap member is formed of a material of sufficient elasticity which permits said free end to bend outwardly and away from abutment with said lateral interior vehicle body portion of said vehicle upon inflation of said air bag.

16. A combination according to claim 15, wherein said flap member includes pre-tension means for holding said flap member in abutment with said lateral interior vehicle body portion.

17. A combination according to claim 11, wherein said flap member includes pre-tension means for holding said flap member in abutment with said lateral interior vehicle body portion.

18. A combination according to claim 17, wherein said pre-tension means comprises a spring saddle disposed internally of said flap member.

19. A combination according to claim 17, wherein said flap member is U-shaped in horizontal section.

20. A combination according to claim 17, wherein said free end of said flap member is provided with a friction reducing surface at least in an region adjacent the abutment with the lateral interior vehicle body portion.

* * * * *